United States Patent
Hart (10) Patent No.: US 11,293,838 B2
(45) Date of Patent: Apr. 5, 2022

(54) HANDS-FREE TRACK TENSION MEASURING DEVICE FOR SNOWMOBILES

(71) Applicant: I S A T GAUGES, Weare, NH (US)

(72) Inventor: Steven W. Hart, Weare, NH (US)

(73) Assignee: I S A T GAUGES, Weare, NH (US)

( * ) Notice: Subject to any disclaimer, the term of this patent is extended or adjusted under 35 U.S.C. 154(b) by 6 days.

(21) Appl. No.: 16/712,410

(22) Filed: Dec. 12, 2019

(65) Prior Publication Data

US 2020/0249128 A1 Aug. 6, 2020

Related U.S. Application Data (60) Provisional application No. 62/918,480, filed on Feb. 1, 2019.

(51) Int. Cl.
| | |
|---|---|
| G01L 5/00 | (2006.01) |
| G01M 17/03 | (2006.01) |
| G01L 5/06 | (2006.01) |
| G01B 5/25 | (2006.01) |

(52) U.S. Cl.
CPC .............. *G01M 17/03* (2013.01); *G01L 5/06* (2013.01); *G01B 5/25* (2013.01)

(58) Field of Classification Search
CPC ............. G01M 17/03; G01L 5/06; G01B 5/25
See application file for complete search history.

(56) References Cited

U.S. PATENT DOCUMENTS

| | | | | |
|---|---|---|---|---|
| 4,140,111 | A * | 2/1979 | Morrill | A61B 17/921 606/104 |
| 4,466,651 | A * | 8/1984 | Sowa | E21B 19/02 294/82.1 |
| 5,350,185 | A * | 9/1994 | Robinson | B62K 21/20 188/322.19 |
| 5,379,330 | A * | 1/1995 | Lovell | G21C 19/26 376/260 |
| 5,471,814 | A * | 12/1995 | Ruckdschel | B65B 61/14 53/131.3 |
| 6,308,348 | B1 * | 10/2001 | Liou | E03D 1/142 251/55 |
| 6,490,905 | B1 * | 12/2002 | Campbell | B25B 27/0014 29/243.526 |
| 2015/0251203 | A1 * | 9/2015 | Wang | B05B 11/3059 222/153.13 |
| 2017/0325617 | A1 * | 11/2017 | Dujmich | A47J 31/20 |

* cited by examiner

*Primary Examiner* — Max H Noori
(74) *Attorney, Agent, or Firm* — Stephen J. Kenny; Robert Piston; Foley Hoag LLP (57) ABSTRACT

Devices and systems for track tension measurement and alignment of tracked vehicles are provided. A device for measuring tension on a continuous track includes a shaft having a hollow cross section, a pin disposed at least partially through an aperture of the top end of the shaft, a compression member disposed within the inner volume of the shaft such that the pin contacts the compression member, and a base having a hollow cross section and removably attached to an outer surface of the shaft. When the base is attached to the outer surface of the shaft at a predetermined height, and the pin is depressed into the inner volume of the shaft at a predetermined distance, the distance between the top end of the pin and an end of the base is known.

20 Claims, 10 Drawing Sheets

HANDS-FREE TRACK TENSION MEASURING DEVICE FOR SNOWMOBILES

CROSS-REFERENCE TO RELATED APPLICATIONS

This application claims the benefit of U.S. Provisional Application No. 62/918,480, filed on Feb. 1, 2019, which is hereby incorporated by reference in its entirety.

BACKGROUND

Embodiments of the present disclosure relate to track alignment and tension measurement, and more specifically, to hands-free track alignment and tension measurement in snowmobiles.

BRIEF SUMMARY

According to embodiments of the present disclosure, devices and systems for track tension measurement and alignment of tracked vehicles are provided. In some embodiments, a device for measuring tension on a continuous track is provided, the device comprising a shaft having a hollow cross section. In some embodiments, the shaft comprises a top end and a bottom end opposed to each other, the top end and the bottom end each having an inner perimeter and an outer perimeter, an outer surface between the top end and bottom end, and an inner volume, wherein the inner perimeter of the top end defines an aperture. In some embodiments, the device further comprises a pin disposed at least partially through the aperture of the top end of the shaft. In some embodiments, the pin comprises a top end and a bottom end opposed to each other, the top end and bottom end each having an outer perimeter; wherein the bottom end of the pin is disposed within the inner volume of the shaft, and the top end is exposed, and wherein the pin is configured to move longitudinally through the aperture. In some embodiments, the device further comprises a compression member disposed within the inner volume, wherein the compression member is configured to apply a longitudinal force to the bottom end of the pin. In some embodiments, the device further comprises a base having a hollow cross section. In some embodiments, the base comprises a first end and a second end opposed to each other, and an inner surface, wherein the hollow cross section is configured to receive the shaft, and the base is configured to be attached to the outer surface of the shaft along a length of the shaft. In some embodiments, when the base is attached to the outer surface of the shaft at a predetermined height, and the pin is depressed into the inner volume of the shaft at a predetermined distance, the distance between the top end of the pin and an end of the base is known.

In some embodiments, the outer surface of the shaft and the inner surface of the base are threaded with corresponding threading, and the base is configured to be screwed onto the shaft. In some embodiments, a plurality of measurement indicators are disposed on the outer surface of the shaft. In some embodiments, each of the plurality of measurement indicators correspond to a predetermined distance between the top end of the pin and an end of the base.

In some embodiments, the pin comprises an indicator mark disposed on its top end. In some embodiments, the indicator mark is level with the aperture when the compression member is subject to a predetermined force. In some embodiments, the outer perimeter of the top end of the pin is approximately equal to the inner perimeter of the top end of the shaft. In some embodiments, the outer perimeter of the bottom end of the pin is approximately equal to the inner perimeter of the bottom end of the shaft.

In some embodiments, the compression member is a spring. In some embodiments, the spring has a known spring constant. In some embodiments, the spring is a coil spring. In some embodiments, the spring is a Belleville or leaf spring.

In some embodiments, the base comprises a flanged portion on the first end. In some embodiments, the flanged portion is configured to fit over a gap in a snowmobile track. In some embodiments, the base is permanently coupled to the shaft. In some embodiments, the base is removably coupled to the shaft. In some embodiments, the orientation of the base with respect to the shaft corresponds to a predetermined force value.

In some embodiments, the device further comprises a cap disposed at the bottom end of the shaft, wherein the cap abuts the compression member. In some embodiments, the top end of the shaft comprises a cap having a hollow cross section, and the cap is configured to receive the top end of the pin.

In some embodiments, the surface or geometry of the top end of the pin is configured to rest against a bottom of a snowmobile slide rail without slipping off.

DETAILED DESCRIPTION

Tracked vehicles, such as snowmobiles, run on a continuous band of treads or track plates driven by wheels. The large surface area of the track distributes a vehicle's weight better than tires on an equivalent vehicle, thus decreasing the vehicle's ground pressure, making tracked vehicles ideal for traversing soft ground while decreasing the chances of getting stuck due to sinking. Tracked vehicles also have higher traction and better mobility over rough terrain than comparable wheeled vehicles, making them suited for off-road driving.

When operating a tracked vehicle, it is important that the track be maintained at a specific tension. Additionally, in vehicles with multiple tracks, it is important that the tracks be properly aligned with one another at the proper tension. If the track is too loose, the track can slip off of the wheels during use, endangering the driver. The driving wheel can also not come into contact with the track at irregular intervals, reducing performance and resulting in unpredictable riding patterns. If the track is too tight and/or improperly aligned, wear of the track and other components is increased, and it may result in excessive power loss and other decreases in performance. Improper alignment of the track can also result in track walk, which can affect both the performance and safety of the vehicle.

The ideal tension of a track is usually specified by the manufacturer, and is often represented as measurement of how far the track displaces from a given point on the vehicle when a given force is applied. For example, in a snowmobile, track tension is often measured as how far the middle part of the bottom of the track displaces from the slide rail (hyfax) under a given force. For example, proper tension may be given as a one inch displacement from the slide rail when ten pounds of pressure are applied to the bottom of the track. Track alignment is achieved when each track is tensioned to the same tension value.

To adjust the track, an idler wheel is usually moved to modify the total perimeter that the track wraps around. For example, to tighten the track, the idler wheel is moved further away from the center of the vehicle, increasing the total perimeter that the track must wrap around, and thus, increasing the tension in the track. To loosen the track, the idler wheel is moved closer to the center of the vehicle, decreasing the total perimeter, and thus decreasing tension in the track. In a snowmobile, the idler wheel can often be moved by tightening or loosening an adjustment bolt on the idler wheel. In other vehicles, such as tractors, a gas gun can used to push the idler wheel away from the center of the vehicle.

A common method for measuring the track tension involves lifting the vehicle so that the track is resting in the air, and attaching a given weight to the track. The track is then adjusted by moving the idler wheel, and the corresponding displacement of the track is measured. In vehicles with two tracks, such as many snowmobiles, this process must then be repeated for the second track. This process is time consuming and inefficient, as measurements may be taken numerous times before the track is properly tensioned. A person adjusting the track in this way may need to walk back and forth between the idler wheel and the center of the track and frequently change the tools they are using (e.g., from a wrench to a ruler, and vice versa), causing the tensioning process to be tedious and time consuming.

To address these and other drawbacks, a hands-free track alignment and tension measurement device is provided. In embodiments of the present disclosure, the track tension measurement device comprises a shaft having a hollow cross-section, a compression member disposed within the shaft, a pin with a first end and a second end, wherein the first end is exposed and the second end is disposed within the shaft, and a base configured to be placed around the width of the shaft, allowing the device to be mounted on a track.

In use, a user places the device on a track of a tracked vehicle. The device is oriented so that the base is resting on the inner surface of the bottom of the track, and the exposed end of the pin is pointing towards the slide rail. The base is positioned at a predetermined distance along the length of the shaft. The track may then be adjusted until the pin depresses a predetermined distance into the shaft, indicating that the track is tensioned according to the desired specification. In vehicles with more than one track, this process is repeated for each of the remaining tracks, resulting in all of the tracks being aligned at the proper tension. It will be appreciated that once the device is properly configured and placed onto the track, it does not need to be continuously adjusted, and a user can observe whether the track is properly tensioned simply by looking at the device and whether the pin is depressed by the predetermined amount. In some embodiments, an indicator mark is disposed on the pin, so that when the track is properly tensioned, the indicator mark is level with the top of the shaft.

Figure 1:
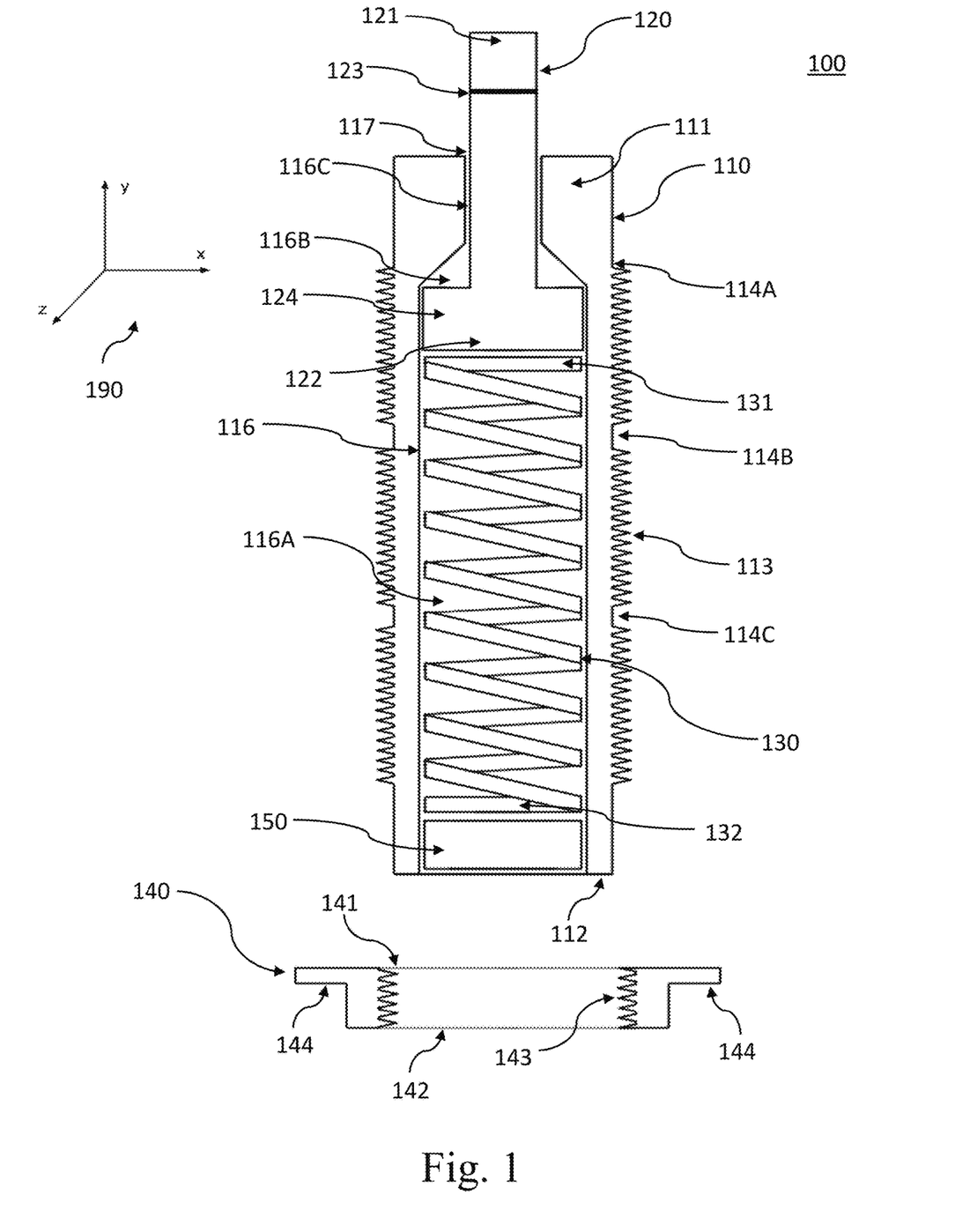
FIG. 1 illustrates a cross-sectional schematic view of a track alignment and tension measurement device according to embodiments of the present disclosure.

Throughout the specification, references made to direction or orientation are assumed to be relative to coordinate axis 190 in FIG. 1, unless otherwise noted. Referring to coordinate axis 190, the y-axis points upwards from the ground, the x-axis is taken to point from left to right, and the z-axis is taken to point from back to front. Terms such as top and bottom, above and below, and over and under are understood to mean higher and lower, respectively, along the y-axis, unless otherwise noted.

Referring now to FIG. 1, a cross-sectional schematic view of a track alignment and tension measurement device according to embodiments of the present disclosure is shown. The view of FIG. 1 is a cross-section in the xy-plane. Track tension measurement device 100 comprises shaft 110, pin 120, compression member 130, and base 140. In some embodiments, device 100 is radially symmetric about the y-axis. In some embodiments, shaft 110, having top end 111, bottom end 112, and outer face 113 has a hollow cross section, enclosing an inner volume 116. In some embodiments, shaft 110 has measurement indicators 114A, 114B, and 114C disposed around its outer surface. In some embodiments, the measurement indicators are disposed at predetermined positions along the length of the shaft. In some embodiments, measurement indicators 114A, 114B, and 114C are disposed at positions corresponding to distances of 1 inch, 2 inches, and 3 inches, respectively.

In some embodiments, device 100 further comprises pin 120 having a top end 121 and a bottom end 122. In some embodiments, the top end 121 is exposed, and the bottom end 122 is disposed within the inner volume 116 of shaft 110. In some embodiments, shaft 110 has an aperture 117 on top end 111, wherein the aperture is sized so that a portion of pin 120 can slide up and down through the aperture. In some embodiments, pin 120 has an indicator mark 123 disposed on its outer surface. In some embodiments, compression member 130, having a top end 131 and bottom end 132, is disposed within the inner volume 116 of shaft 110. In some embodiments, the top end 131 of the compression member 130 is in contact with the bottom end 122 of pin 120. In some embodiments, compression member 130 exerts an upward force on pin 120. In some embodiments, the bottom end 132 of compression member 130 abuts the bottom end 112 of shaft 110. In some embodiments, compression member 130 is a spring.

In some embodiments, bottom end 112 of shaft 110 forms an open circle, and a cap is placed over and/or inside the circle, closing the opening. In such embodiments, the bottom end 132 of compression member 130 can abut the inner surface of the cap.

In some embodiments, track tension measuring device 100 comprises base 140, having a hollow cross-section, top end 141, bottom end 142, and inner surface 143. In some embodiments, base 140 comprises a flange 144 surrounding top end 141.

Shaft 110 can be formed as a unitary piece, or it can be formed from multiple pieces fastened together, such as by interlocking parts or with an adhesive. In some embodiments, shaft 110 is generally cylindrical, although it will be appreciated that it may be a rectangular prism or other shape. In some embodiments, the enclosed inner volume 116 is generally cylindrical, although it will be appreciated that it may be of a different shape, or have portions that increase or decrease in cross-sectional area. In embodiments where both shaft 110 and inner volume 116 are generally cylindrical, shaft 110 has an annular cross-sectional area in the xz plane.

In some embodiments, inner volume 116 comprises a main section 116A, a tapered section 116B above the main section, and a top section 116C above the tapered section that ends in aperture 117. In some embodiments, the top section 116C is of a smaller cross-sectional area in the xz-plane than the main section 116A. In some embodiments, sections 116A and 116C are generally cylindrical, while section 116B is generally conical. In embodiments where inner volume 116 is generally a rectangular prism, sections 116A and 116C can be generally rectangular prisms, while section 116B can be generally pyramidal. It will be appreciated that a variety of sizes can be used for sections 116A, 116B, and 116C of inner volume 116. In some embodiments, the size of tapered section 116B is negligible, and there is a step transition between sections 116A and 116C. In some embodiments, the size of top section 116C is negligible, and inner volume 116 comprises only the main section 116A and tapered section 116B. Tapered section 116B may be tapered inwards at a variety of angles, ranging from 90° (essentially no tapering, wherein tapered portion 116B has a negligible size, and there is a step transition between sections 116A and 116C) to around 0° (nearly vertical). In some embodiments, all three section 166A-C have uniform geometry.

In some embodiments, outer face 113 is generally smooth. In some embodiments, outer face 113 is threaded. In some embodiments, outer face 113 is threaded along its entire length. In some embodiments, outer face 113 is threaded along only a portion of its length. For example, in some embodiments, outer face 113 is not threaded on the bottom end of shaft 112. This can facilitate as a guide for base 140, enabling easier and quicker attachment of the base to the shaft. In some embodiments, outer face 113 is not threaded near top end 111 and bottom end 112. This can allow for easy attachment of base 140 from either direction. The threading may be of any size, e.g. a tap size of ¾-10. In some embodiments, measurement indicators 114A-C are disposed on the outer face. In some embodiments, measurement indicators 114A-C are disposed on the threading. In some embodiments, there is no threading at the locations of measurement indicators 114A-C, so that the measurement indicators have a planar surface. Measurement indicators may be in the form of a groove, a painted line, or a protruding piece. In embodiments where the outer face 113 is threaded, the measurement indicators can be disposed on the outer face in such a way so as to allow for an object, such as base 140, to be screwed at various positions along the length of shaft 110, without interference by the measurement indicators. In some embodiments, measurement indicators 114A-C are disposed around the entire perimeter of the shaft 110 (in the xz plane). In some embodiments, measurement indicators 114A-C are disposed along only a portion of the perimeter.

In some embodiments, measurement indicators 114A-C are disposed at predetermined distances from top end 111 and/or bottom end 112 of shaft 110. It will be appreciated that various numbers of measurement indicators may be disposed on face 113. In some embodiments, the predetermined distances are written on the measurement indicators for easy identification. In some embodiments, the predetermined distances are written elsewhere, e.g., in an instruction manual for using device 100. In some embodiments, measurements are disposed along the length of face 113 (along the y-axis) at predetermined intervals (e.g., every inch, half inch, quarter inch, or centimeter). In some embodiments, the measurements correspond to lengths in imperial units and/or metric units.

In some embodiments, the bottom end 112 of shaft 110 is closed. In some embodiments, the bottom end 112 of shaft 110 is open. In some embodiments, the bottom end 112 of shaft 110 has a cross section substantially similar to the cross section in the middle of shaft 110.

In some embodiments, device 100 comprises cap 150, which can provide a surface for compression member 130 to compress against, and also prevent components disposed within volume 116 from falling out of the device. Cap 150 may be disposed entirely within the inner volume 116, or may protrude somewhat. In some embodiments, cap 150 is entirely outside of inner volume 116. Cap 150 may be removable from device 100, or may be permanently affixed to shaft 110. It will be appreciated that a variety of methods may be used to attach cap 150 to shaft 110. In some embodiments, cap 150 and shaft 110 are held together via friction. In some embodiments, cap 150 and shaft 110 are held together via a chemical adhesive, such as glue. In some embodiments, cap 150 and shaft 110 are fused together, such as by welding. In some embodiments, cap 150 and shaft 110 are threaded, and cap 150 is screwed into and/or around the bottom end 112 of shaft 110. Cap 150 can take many forms, such as a hollow cylinder, a solid cylinder or a flat disk. In some embodiments, the bottom 132 of compression member 130 is attached to the top of cap 150.

Shaft 110 can be in a variety of sizes. In some embodiments, shaft 110 is longest in the y direction, and substantially shorter in the x and z directions. In some embodiments, shaft 110 has a length approximately equal to, or greater, than the distance between the lowest point on a loose snowmobile track and the slide rail (or hyfax). This can be on the order of a few inches e.g., 3-6 inches. In some embodiments, the cross-sectional area of shaft 110 in the xz-plane is smaller than the openings in a snowmobile track, such that the shaft can be placed through an opening in the snowmobile track.

In some embodiments, pin 120 is partially disposed within inner volume 116, such that the bottom end 122 of pin 120 is disposed within inner volume 116 and top end 121 is exposed above the top end 111 of shaft 110. Pin 120 may take on a variety of forms. In some embodiments, pin 120 is generally cylindrical. In some embodiments, pin 120 has a cross-sectional area in the xz-plane of a similar size as aperture 117, allowing the pin to slide up and down the inner volume 116 without significant frictional resistance against the walls of inner volume 116, and without significant movement in the xz-plane. In some embodiments, the top end 121 of pin 120 has a generally flat top. It will be appreciated the top surface 121 of pin 120 should be of such geometry and materials that it can rest stably against the bottom of a slide rail of a snowmobile without sliding off or damaging the slide rail.

In some embodiments, pin 120 comprises a flanged portion 124 on its lower end. In some embodiments, the flanged portion 124 is of a similar cross-sectional area in the xz-plane as the cross-sectional area of main section 116A of inner volume 116. This can allow for the flanged portion to move up and down the shaft without significant undesirable movement in the x and z directions. In some embodiments, the flanged portion 124 is cylindrical. In some embodiments, the flanged portion 124 is conical, tapering inwards along the +y axis. In some embodiments, the flanged portion 124 has a cylindrical base and a conical top, with sides that are vertical along a portion of the heights, and then taper inward along the +y axis. In some embodiments, the flanged portion 124 is tapered at an angle substantially similar to the tapering angle of tapered section 116B. It will be appreciated that while the pin 120 can slide up and down the inner volume, the flanged portion 124 can be made wide enough so that it cannot fit through aperture 117, preventing pin 120 from falling out of the top end 111 of shaft 110.

In some embodiments, pin 120 comprises an indicator mark 123. Indicator mark 123 can be formed as a groove in pin 120, as a colored line, or as any other noticeable marking. In some embodiments, indicator mark 123 is disposed at a predetermined position along the length of pin 120 so that it is at the same height as aperture 117 when the pin is depressed into inner volume 116 by a predetermined distance. In some embodiments, indicator mark 123 is of a size and/or color such that it can be seen from a few feet away. For example, when device 100 is placed in the middle of a snowmobile track, a person adjusting the track tension near the end of the snowmobile is able to clearly see indicator mark 123, and be able to ascertain when it becomes level with aperture 117. In some embodiments, multiple markings are disposed along the length of pin 120 at predetermined intervals or distances from the ends of the pin.

It will be appreciated that the relative lengths dimensions of the flanged portion 124 and the rest of pin 120 may vary. In some embodiments, the non-flanged portion of the pin is substantially longer than the flanged portion 124. In other embodiments, the non-flanged portion and the flanged portion 124 are approximately the same length. In other embodiments, the non-flanged portion is substantially shorter than the flanged portion 124. The pin 124 should be sufficiently long in the y-axis so as to not get stuck inside shaft 110 should the pin be depressed by a maximum distance.

It will be appreciated that the surface of top end 121 of pin 120 can be made to resist slipping out from underneath the slide rail of a snowmobile. For example, the top surface can have a frictional coating or surface, or a flanged portion in order to increase the surface area abutting the bottom of the slide rail.

In some embodiments, compression member 130 is a spring, such as a coil spring, a Belleville, or a leaf spring. In some embodiments, compression member 130 is a piston or chamber containing a compressible fluid. However, it will be appreciated that many different compressible mediums may be used, provided that it is possible to correlate the distance that the member is compressed in the y-direction with the force applied to the member. In embodiments where compression member 130 is a spring, the spring constant is known, and the distance that the spring is compressed can be calculated as a function of the force applied to it in the −y-direction.

Compression member 130 is shaped so that it can fit within the inner volume 116 of shaft 110. In some embodiments, the cross-sectional area of compression member 130 in the xz-plane is approximately equal to the cross-sectional area of main section 116A of inner volume 116. In some embodiments, the bottom 132 of compression member 130 rests against the bottom 112 of shaft 110 or against the top of cap 150. In some embodiments, the bottom end 122 of pin 120 rests against the top 131 of compression member 130.

In some embodiments, the spring is under no compressing forces when the device is not in use (i.e., its resting state). In some embodiments, the spring is under a known amount of compressive force in its resting state.

In some embodiments, base 140 is shaped with a hollow cross-section in the xz-plane. In some embodiments, base 140 is shaped so that it can receive shaft 110 inside the hollow cross-section. In some embodiments, inner surface 143 of base 140 is made so that it can be attached to the outside of shaft 110. In some embodiments, the perimeter of inner surface 143 in the xz-plane is approximately equal to the outer perimeter of the shaft 110 in the xz-plane, allowing base 140 to be placed around shaft 110. In some embodiments, inner surface 143 has a circular cross-section in the xz-plane. In some embodiments, inner surface 143 wraps around shaft 110 on all sides. In other embodiments, inner surface 143 wraps around shaft 110 on some sides. In some embodiments, inner surface 143 is threaded. In some embodiments where both outer face 113 of shaft 110 and inner surface 143 of base 140 are threaded, the threadings correspond to one another such that base 140 can be attached to shaft 110 by screwing it onto the shaft. In some embodiments, the threading is such that individual turns, or half turns, of base 140 around shaft 110 move the base 140 along the y axis by a predetermined distance. In alternative embodiments, such as where the outside face 113 of shaft 110 is smooth, base 140 can be structured as a clamp, and can remain affixed to the outside of shaft 110 via frictional force.

In some embodiments, flange 144 extends outward in the xz-plane on all sides of base 140. In other embodiments, flange 144 extends outward only on some of the sides of base 140. For example, flange 140 may extend outward on two opposing sides of base 140, such as the in the embodiments shown in FIGS. 3-7. In some embodiments, base 140 is a T-shaped block.

In some embodiments, base 140 is appropriately sized so that the flange 144 can rest above a gap in a snowmobile track, while the non-flanged portion of base 140 can fit within the gap. In some embodiments, base 140 is configured to fit snugly within the gap in the snowmobile track, so that in use, the device 100 does not move a significant amount in the xz-plane.

In some embodiments, base 140 is permanently coupled to shaft 110, but may be moved up and down the shaft. In other embodiments, base 140 is removably coupled to shaft 110. In some embodiments, the base 140 be positioned along the length of the shaft 110 in discrete intervals and/or distances from the top end 111 of shaft 110. In some embodiments, base 140 can be positioned at any point along the length of shaft 110.

Figure 2:
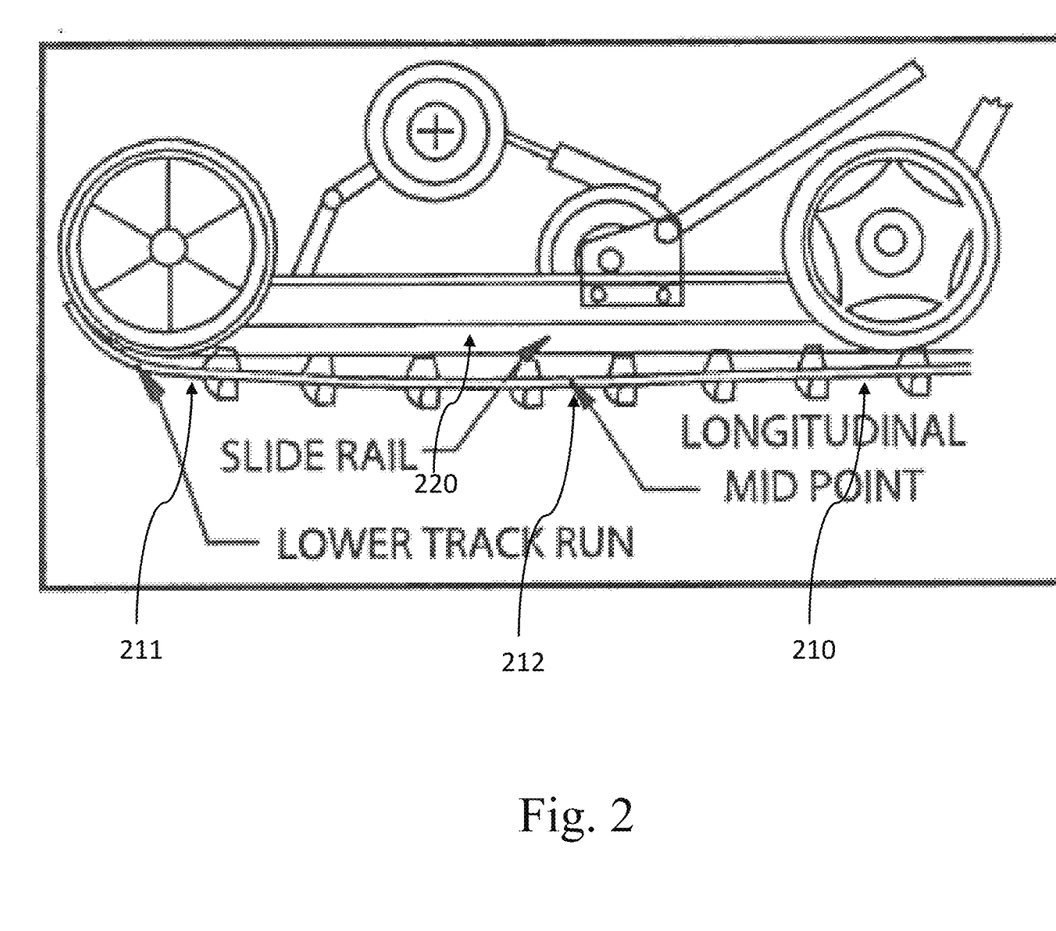
FIG. 2 depicts a schematic view of a snowmobile track system according to embodiments of the present disclosure.

Referring to FIG. 2, a schematic view of a snowmobile track system according to embodiments of the present disclosure is shown. In use, a track tension measurement device would be placed so that it rests in between the lower portion 211 of the track 210 and the slide rail 220. The device is positioned at the longitudinal midpoint 212 of the track 210. This can correspond to the location at which manufacturers recommend measuring the tension of a track.

Figure 3A:
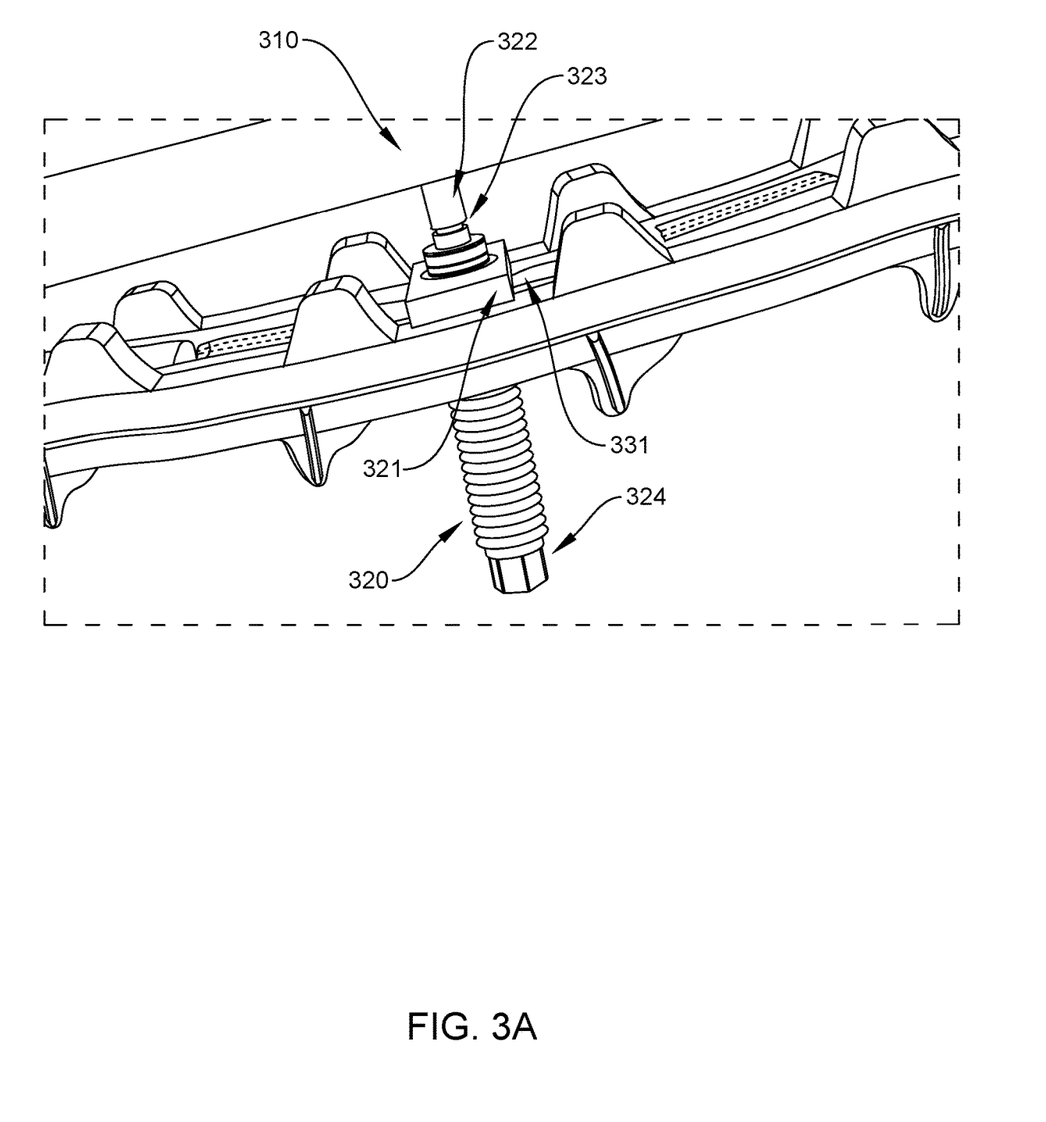
FIGS. 3A-B depicts a track alignment and tension measurement device in use in a tracked vehicle according to embodiments of the present disclosure.
Figure 3B:
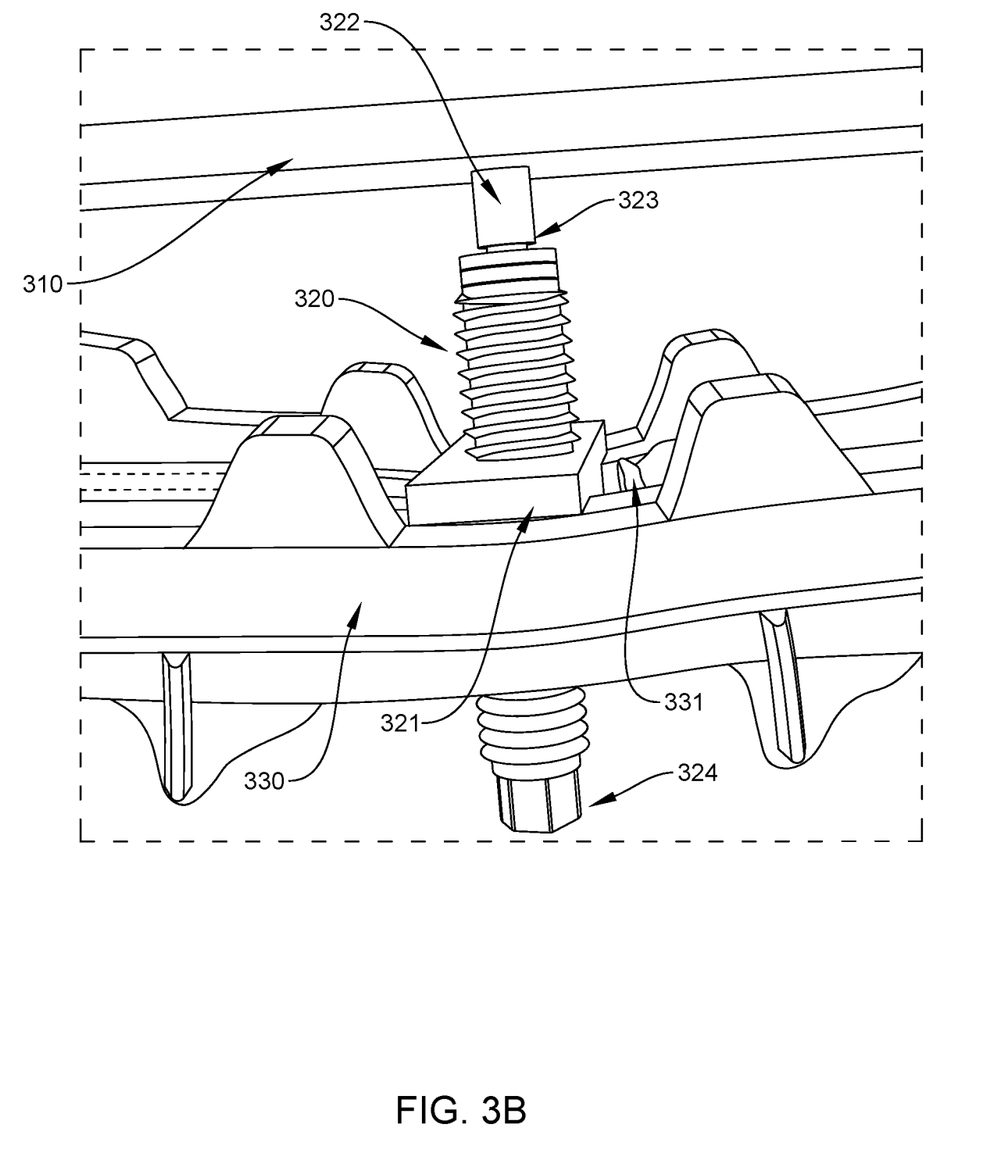
Figure 4:
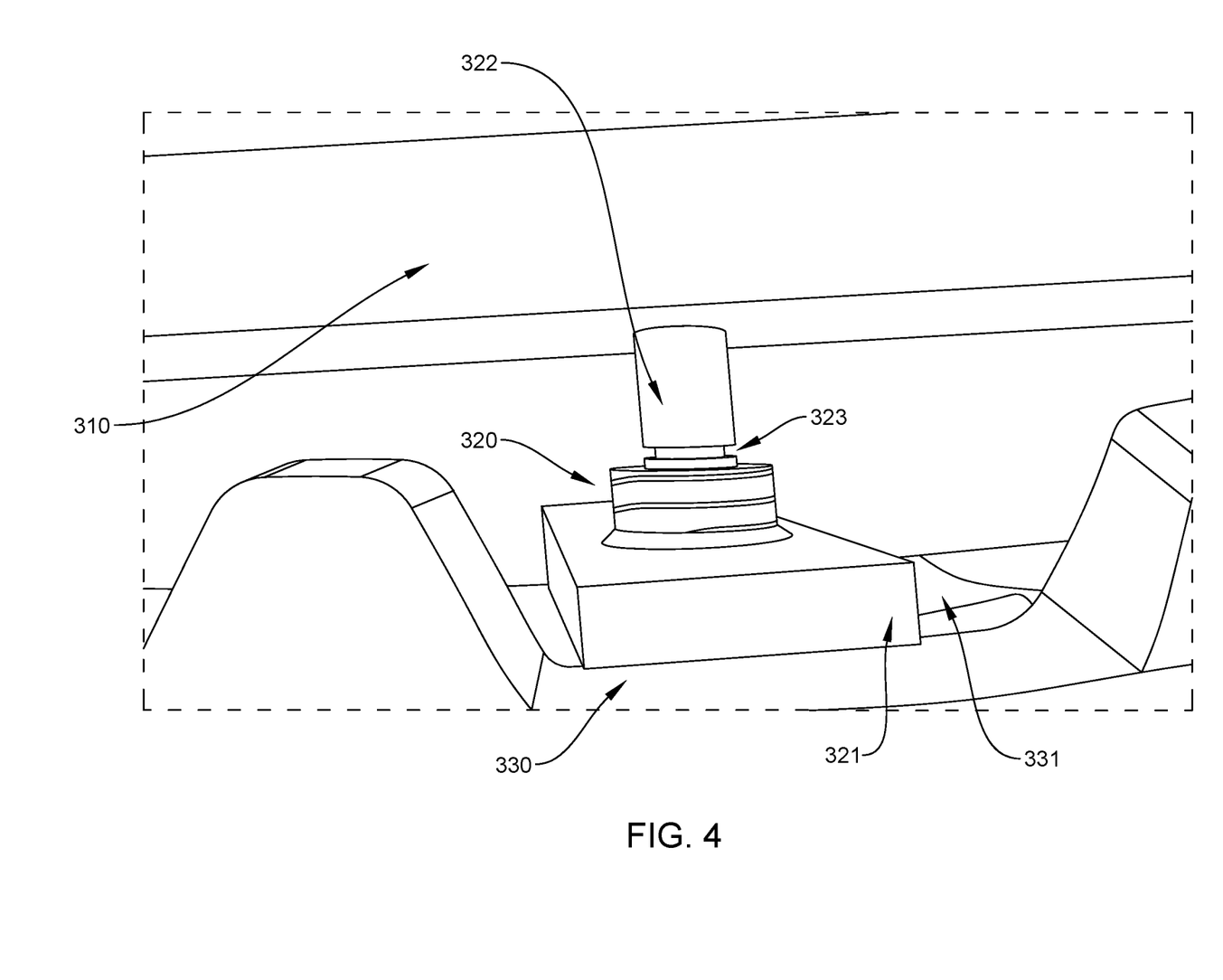
FIG. 4 depicts a close-up view of the track alignment and tension measurement device of FIGS. 3A-B according to embodiments of the present disclosure.

Referring to FIGS. 3A-B, a track tension alignment and measurement device in use in a tracked vehicle is shown according to embodiments of the present disclosure. Track tension measurement device 320 is placed between slide rail 310 and track 330. In some embodiments, device 320 is made to be placed at the longitudinal midpoint of the track, halfway between the front and back. This corresponds to the location at which track tension is measured according to many manufacturer guidelines. Base 321 is placed at a predetermined location along the height of shaft 324. FIG. 3A shows base 321 placed at one location along the shaft, while FIG. 3B shows base 321 placed at another location along the shaft. The predetermined location can correspond to a distance, such as a manufacturer-provided reference distance for tension measurement, as described above. The device 320 is placed so that base 321 rests above a hole 331 in the track 330, with shaft 324 suspended through hole 331. Pin 322 is partially disposed within shaft 324, and partially exposed. When the track is loose, the top of pin 322 does not reach the slide rail 310. As the track is tightened, the distance between track 330 and rail 310 decreases, and device 320 is brought closer to rail 310; whereupon pin 322 eventually makes contact with slide rail 310. As the track is tightened further, the tension in track 330 pushes pin 322 against rail 310, and pin 322 is pushed into shaft 324 through an opening at the top of the shaft, causing a compression member inside shaft 324 to compress. An indicator mark 323 is disposed on pin 322. When indicator mark 323 is flush with the opening at the top of the shaft, the compression member is compressed by a known distance, and the track is properly tensioned. This distance corresponds to a known force, or weight, applied downwards onto the compression member. In some cases, where the track is too tight, indicator mark 323 is below the opening and is not visible. In this case, the track can be loosened, causing pin 322 to move upwards. The track can be loosened until the indicator mark is just visible, indicating that the track is properly tensioned. FIG. 4 depicts a close-up view of the device 320 in use.

In some embodiments, to use the track tension measurement device, the tracked vehicle must be raised above the ground by a certain height (e.g., 6-10 inches). This allows the track to hang loosely on the vehicle without any upward forces from the ground. In vehicles where the track is held by track locking nuts, the track locking nuts may have to be loosened prior to tensioning the track. The track tension measurement device 320 can be placed over a hole in the track at the longitudinal midpoint of the track and slide rail, oriented so that pin 322 faces upwards towards the slide rail. The base 321 of the device is oriented corresponding to the desired weight to be measured, and it is attached to the shaft 324 of the device at a height corresponding to the desired distance at which the measurement is to be taken. The track is tightened until indicator mark 323 is flush with the top of shaft 324. At this point, the track is tightened according to the desired tension. These steps can be repeated for each side of the vehicle. If the vehicle is equipped with locking nuts, they can be tightened to secure the track in place and complete the tensioning process.

Figure 5:
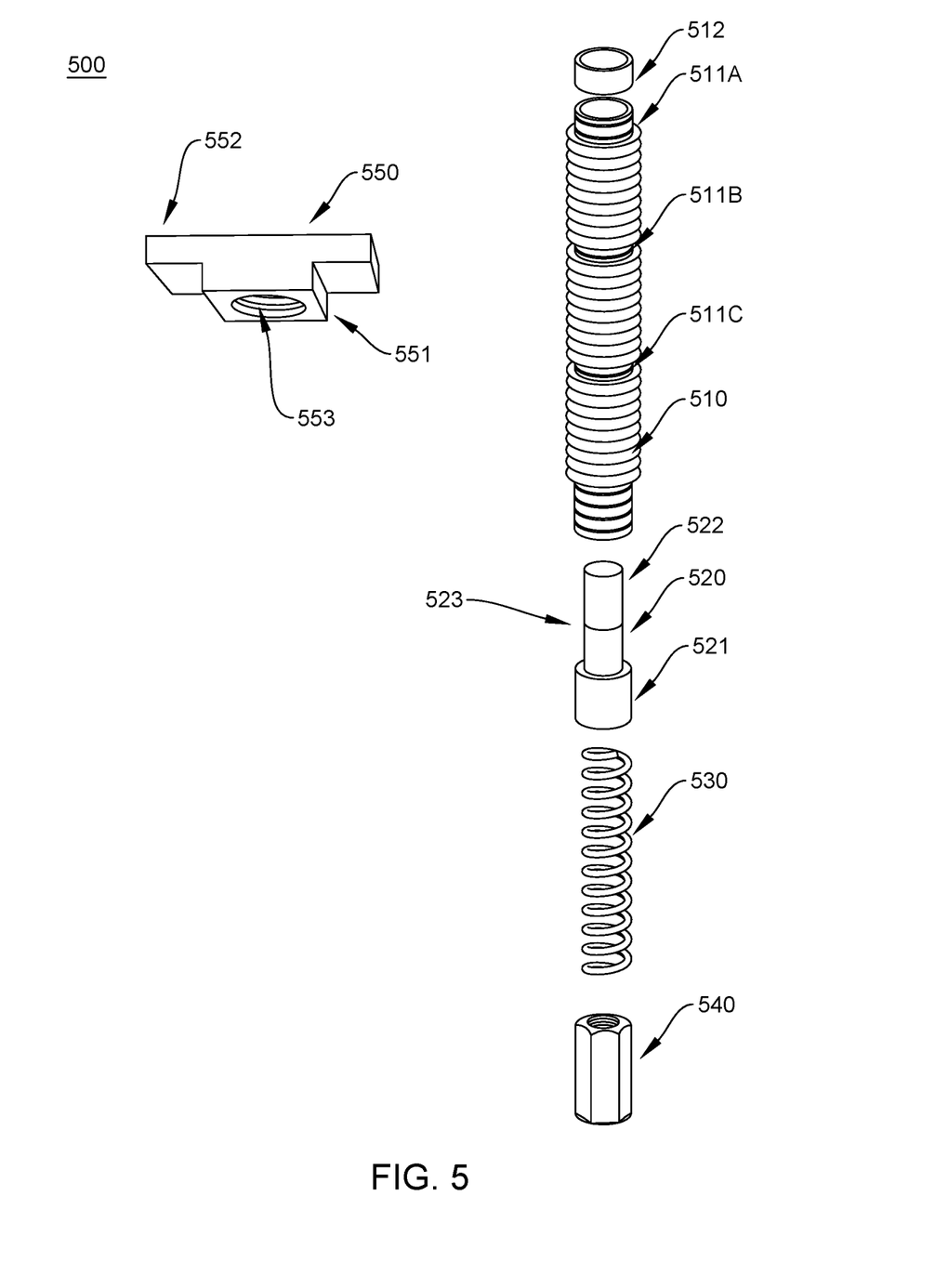
FIG. 5 depicts an exploded view of a track alignment and tension measurement device according to embodiments of the present disclosure.

Referring now to FIG. 5, an exploded view of a track tension measurement device according to embodiments of the present disclosure is shown. The view in FIG. 5 is upside down from how the device is oriented in use. Device 500 comprises shaft 510, pin 520, compression member 530, cap 540, and base 550. In the embodiment of FIG. 5, shaft 510 is generally cylindrical, with a threaded outer surface. Shaft 510 is hollow, with a cylindrical inner volume, adapted to receive pin 520, compression member 530, and cap 540. Pin 520 has a top portion 522 and a flanged portion 521, which in some embodiments has a diameter approximately equal to the inner diameter of shaft 510. In some embodiments, cap 512 affixed inside the top end of shaft 510. Cap 512 can be ring shaped, with an outer diameter approximately equal to the inner diameter of shaft 510 and an inner diameter approximately equal to the diameter of the non-flanged portion of pin 520. The placement of cap 512 in shaft 510 prevents pin 520 from falling out of shaft 510, as the flanged portion 521 is blocked by cap 512, and also acts as a guide for pin 520 by restricting its motion to one dimension (i.e., up/down). Compression member 530, shown in FIG. 5 as a spring, is configured to fit within shaft 510. In some embodiments, the diameter of compression member 530 is approximately equal to the inner diameter of shaft 510. In embodiments where compression member 530 is a spring, its spring constant is known, and the distance by which it is compressed can be calculated as a function of the force applied to compress it. Cap 540 is placed in the bottom end of the shaft 510, underneath compression member 530. In some embodiments, cap 540 has a diameter approximately equal to the inner diameter of the shaft 510. Cap 540 prevents various components, such as compression member 530 and pin 520, from falling out of shaft 510. In some embodiments, cap 540 is permanently attached to shaft 510. Base 550 has a hollow cross section with non-flanged portion 551, flange 552, and inner surface 553. Inner surface 553 is threaded with a threading corresponding to the threading of the outside of shaft 510, so that base 550 can be attached to shaft 510 by screwing it on. In some embodiments, base 550 is generally rectangular. In some embodiments, non-flanged portion is configured to fit within a gap in a snowmobile track, and flanged portion 552 is configured to rest above the gap. In some embodiments, base 550 is configured to rest snugly in and above the gap in a snowmobile track, limiting movement of the device when in use.

In some embodiments, changing the orientation of base 550 changes the weight indicated by indicator mark 523. In some embodiments, placing the base 550 on shaft 510 so that the flanged portion 551 faces upwards corresponds to measuring a weight of 20 lbs. when the indicator mark 523 is flush with the top of shaft 510. In some embodiments, placing the base 550 on shaft 510 so that the flanged portion 551 faces downwards corresponds to measuring a weight of 10 lbs. when the indicator mark 523 is flush with the top of shaft 510. In some embodiments, the threading on shaft 510 is chosen such that each half-turn (i.e., 180 degrees) of the base 550 further up the shaft corresponds to an increase in the measured weight by two pounds, and each half-turn further down the shaft corresponds to a decrease in the measured weight by 2 lbs. However, it will be appreciated that a variety of different weights can be measured by the device by modifying the geometry of the base, the type of compression member used, the placement of the indicator marks, or other changes to the device.

In some embodiments, measurement indicators 511A-C are disposed on the outer surface of shaft 510. In some embodiments, measurement indicators 511A-C correspond to various distances used to measure track tension. For example, measurement indicators 511A, 511B, and 511C can correspond to distances of 1 inch, 2 inches, and 3 inches, respectively. These distance can correspond to the total distance between the bottom of the slide rail and the track when the device 500 is placed in between, and base 550 is attached so that its top is flush with the respective measurement indicator. In use, the measurement indicator used can correspond to a manufacturer's guidelines for tensioning the track.

It will be appreciated that the measurement indicators 511A-C can be formed in a variety of ways. In some embodiments, the measurement indicators 511A-C are painted on the outer surface of shaft 510. In some embodiments, the measurement indicators 511A-C are formed as a groove in the outer surface of shaft 510. In embodiments where the outer surface of shaft 510 is threaded, the measurement indicators 511A-C can take the form of unthreaded grooves in the outer surface.

In some embodiments, device 500 is configured so that in use, measuring a correct distance requires that the top end of base 550 is flush with the bottom of any of measurement indicators 511A-C. In some embodiments, measuring a correct distance requires that the top end of base 550 is flush with the top of any of measurement indicators 511A-C.

For example, if a manufacturer specification states that the track should have a displacement of 2 inches under a load of 20 lbs., the base can be placed so that the flanged portion 551 faces upwards and is flush with the bottom of measurement indicator 511B.

In some embodiments, the distance from the top end of pin 520 to indicator mark 523 is 0.5 inches, the distance between the top of shaft 510 and the first measurement indicator 511A is 0.25 inches, and the distance between the top and bottom of the flanged portion 552 of base 550 is 0.25 inches. Thus, when the base 550 is placed on the shaft 510 such that the flanged portion 552 faces upwards, and the top of flanged portion 552 is flush with indicator mark 511A, the total distance between the top of pin 520 and the bottom of flanged portion 552 is one inch when indicator mark 523 is flush with the top end of shaft 510. In some embodiments, measurement indicator 511B is disposed one inch below measurement indicator 511A, and measurement indicator 511C is disposed one inch below measurement indicator 511B. Thus, when the top of flanged portion 552 is flush with measurement indicator 511B or 511C, and indicator mark 523 is flush with the top end of shaft 510, the distance between the top end of pin 520 and the bottom of flanged portion 552 is 2 and 3 inches, respectively. Accordingly, when the device is placed between the track and slide rail of a snowmobile, these distances correspond to the distance between the track and the slide rail.

In some embodiments, cap 540 can be movable longitudinally along the length of the shaft 510. Moving cap 540 along the shaft can adjust the compression force exerted on compression member 530 when the device is in a resting state, thus calibrating device 500 to different force settings. In some embodiments, cap 540 remains stationary, but comprises components that can be adjustable to vary the default compression force exerted on compression member 530. For example, a bolt can be integrated into cap 540, such that tightening the bolt further into shaft 510 causes the force on compression member 530 to increase. In some embodiments, the bolt comprises indicator lines disposed on its surface. The indicator lines can correspond to various compression distances and forces of compression member 530. For example, when one of the indicator lines is flush with the bottom of cap 540, a known force (e.g., 10 lbs., 20 lbs.) is needed to compress pin 520 such that indicator mark 523 is flush with top end of shaft 510.

Figure 6:
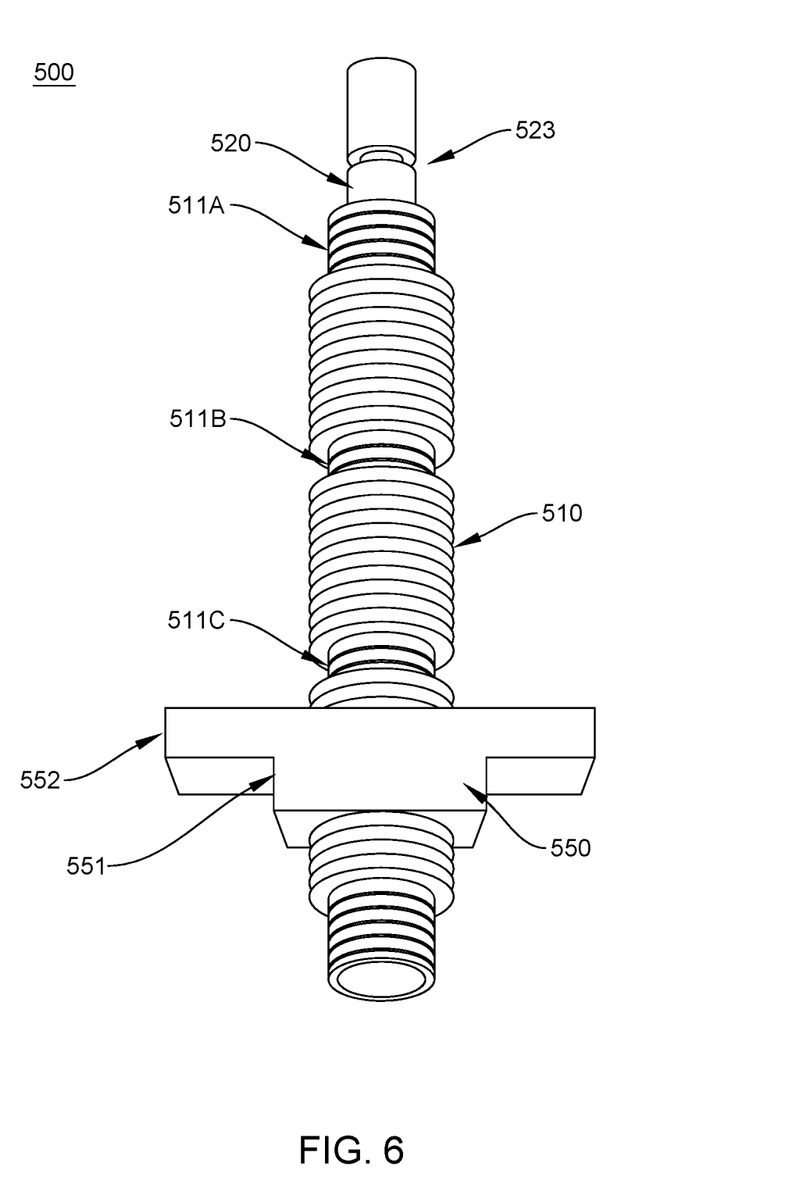
FIG. 6 depicts an assembled view of a track alignment and tension measurement device according to embodiments of the present disclosure.

Referring to FIG. 6, an assembled view of a track tension measurement device of FIG. 5 according to embodiments of the present disclosure is shown. Pin 520 is partially disposed within shaft 510. Base 550 is attached along the length of shaft 510.

Figure 7A:
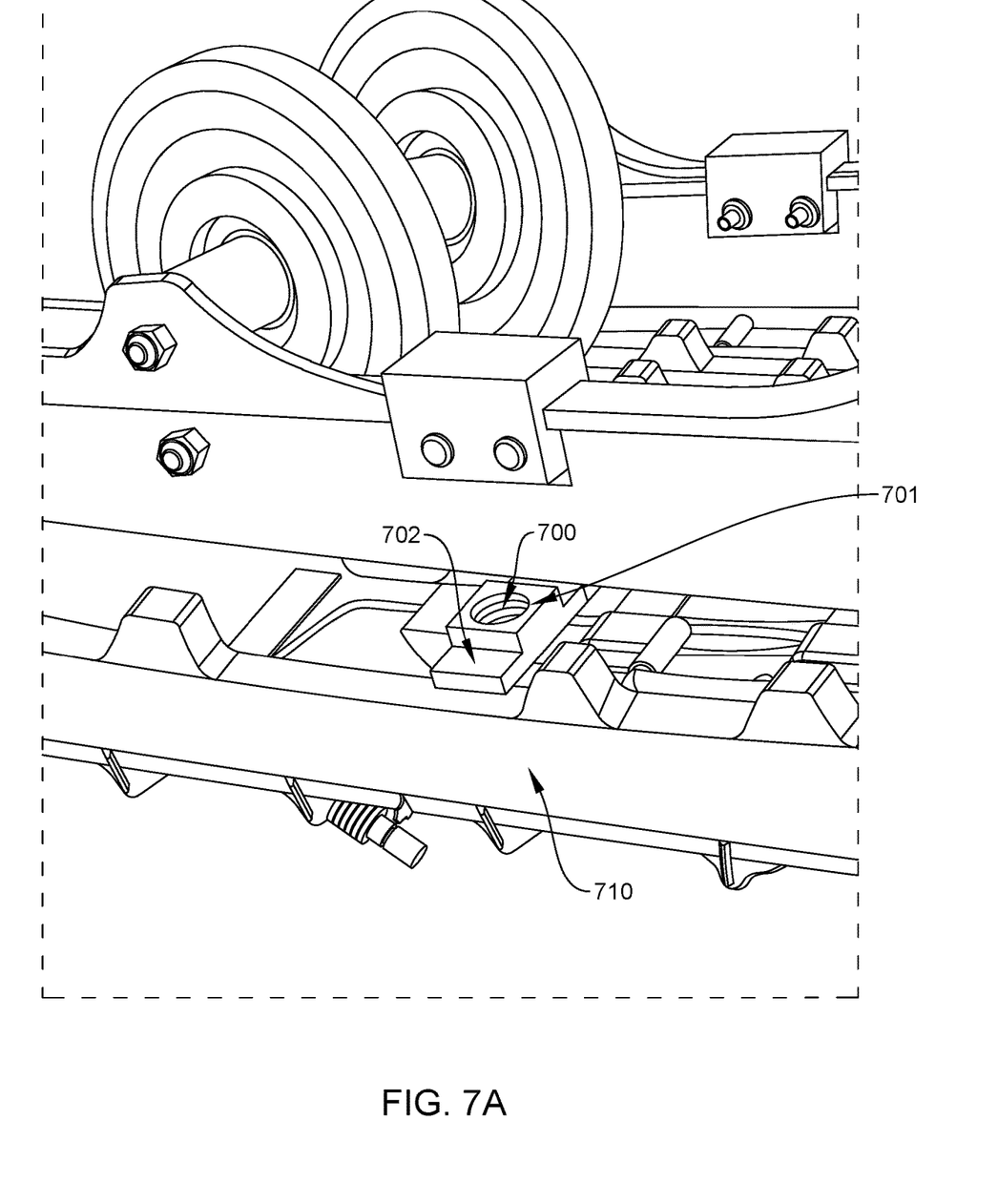
FIG. 7A-B depict a base of a track alignment and tension measurement device according to embodiments of the present disclosure.
Figure 7B:
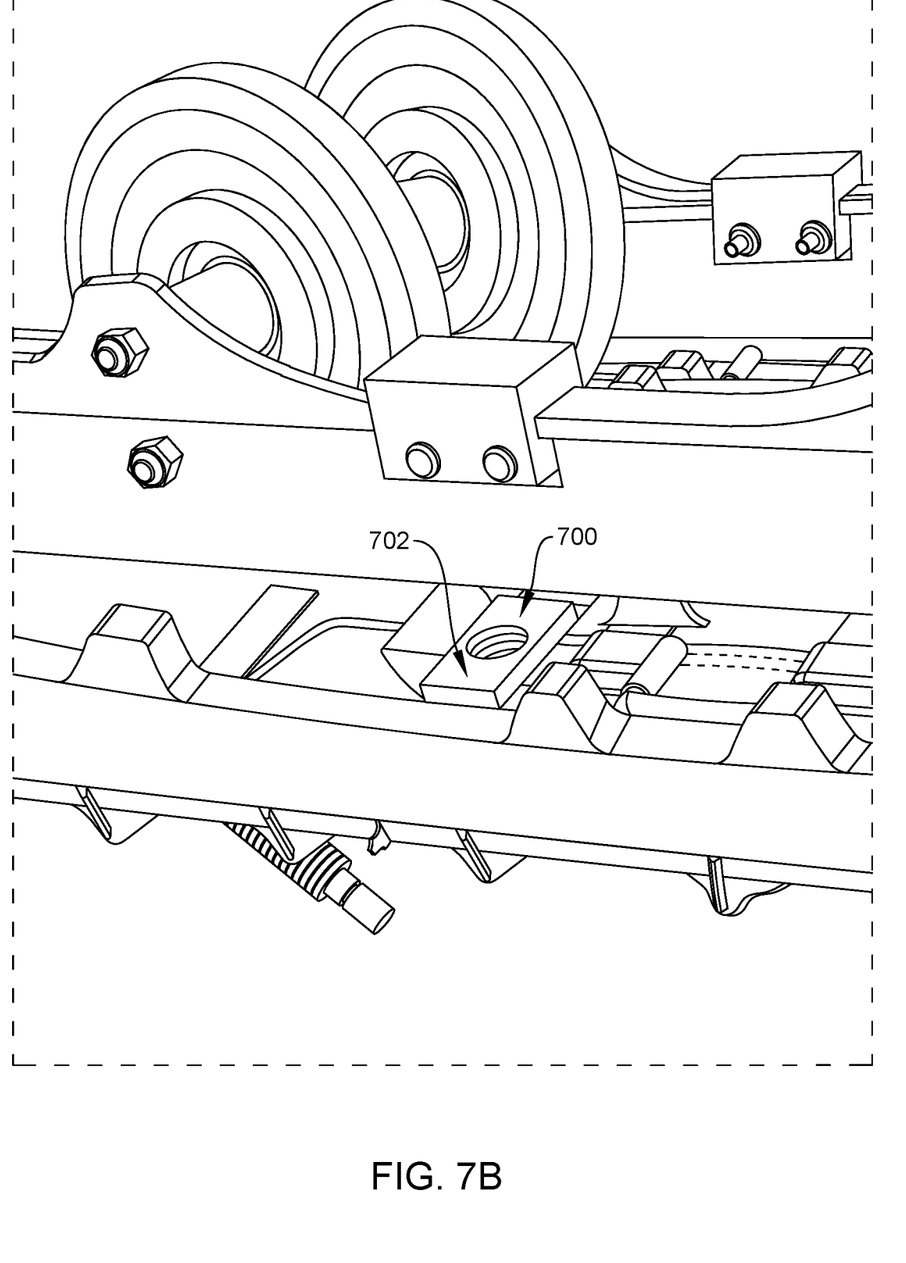

Referring to FIGS. 7A-B, a base of a track alignment and tension measurement device according to embodiments of the present disclosure is shown. Base 700 can be oriented such that non-flanged portion 702 is on top, while flanged portion 701 rests over a hole in snowmobile track 710, as shown in FIG. 7A. Alternatively, base 700 can be oriented such that flanged portion 702 is on top, and rests over a hole in snowmobile track 710, while the non-flanged portion rests inside the hole, as shown in FIG. 7B. The different orientations of base 700 can correspond to different weights and/or distances being measured.

Figure 8:
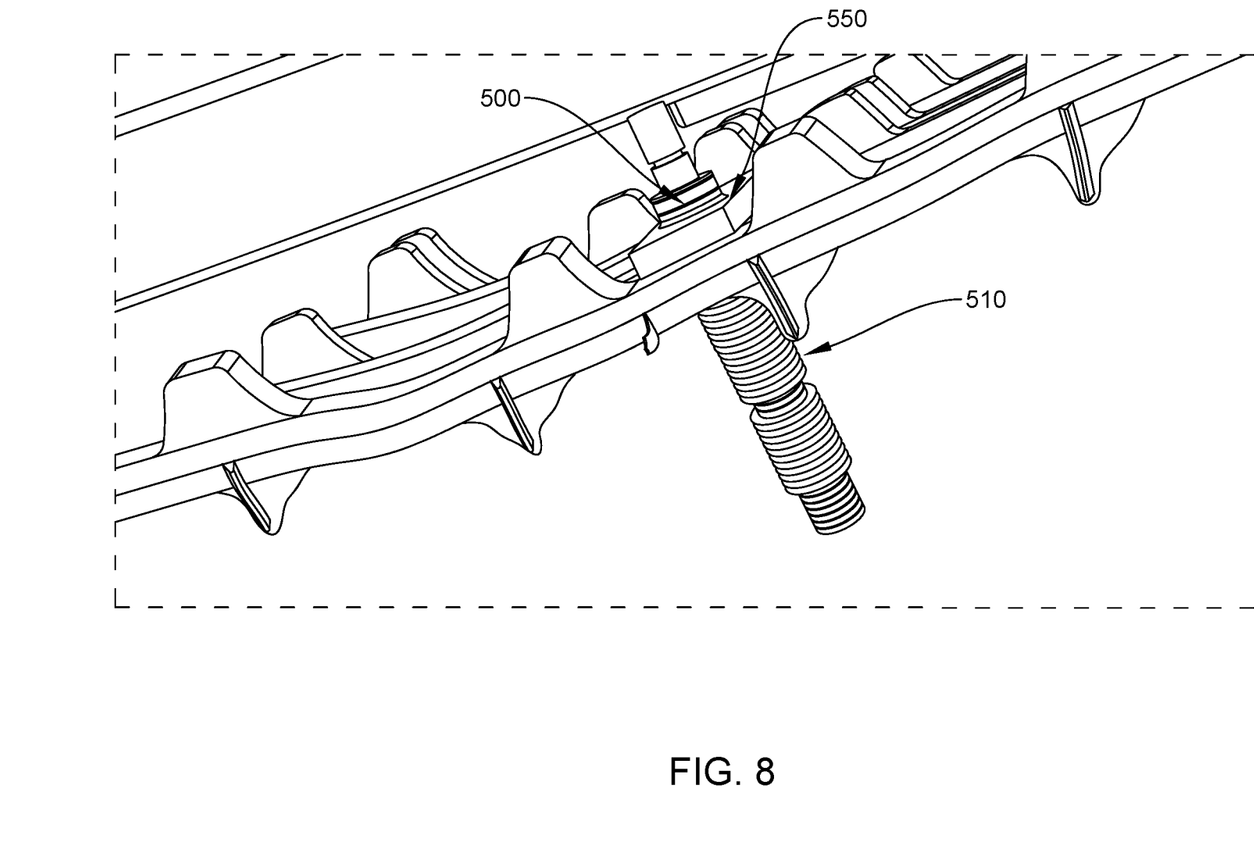
FIG. 8 depicts an alternative view of the track alignment and tension measurement device of FIG. 6 according to embodiments of the present disclosure.

Referring now to FIG. 8, an alternative view of the track alignment and tension measurement device of FIG. 6 according to embodiments of the present disclosure is shown. Device 500 is placed between a snowmobile track and slide rail. Shaft 510 can be positioned relative to base 550 by twisting either the shaft or base. In situations where there is not enough space between the slide rail and track to insert the base 550 with the shaft 510 attached, the device can be inserted by first placing base 550 in the desired position, and then inserting shaft 510 through the base from the bottom.

In some embodiments, the device can be fitted with electronic components that can provide an additional indication of when a track is properly tensioned. In some embodiments, a pressure transducer or force sensor can be used to trigger an alarm or light when a predetermined amount of force is applied to the sensor. The components can be placed inside the shaft or outside of the shaft. In some embodiments, some electronic components are placed inside the shaft while others are placed outside. For example, a sensor can be placed under the compression member or between the compression member and the pin. A variety of pressure or force gauges can be compatible with the device, such as ones based on twist lock, screw pin, collet, dial indicator, or digital mechanisms. When a predetermined amount of force is applied to the pressure sensor, a light or alarm connected to the pressure sensor will be triggered. The light or alarm can be connected to the outside of the device such that they are visible or audible to a user. The use of electronic components can aid a user in determining when the track is properly tensioned.

It will be appreciated that a variety of suitable materials can be used for the various components of a track tension measurement device. Suitable materials include, but are not limited to, metals (e.g., aluminum), plastics, and composite materials. Materials used can be made to withstand harsh weather conditions and rough use. The material used for the compression member can be such that the compression member is not deformed when significant pressure is applied to it, although in some embodiments, the device is constructed so that the compression member never fully compresses in use, and a less durable compression member can be used. The material used for the device can be chosen based on cost and ease of manufacture.

In addition to the specific embodiments described above, the disclosed subject matter is also directed to other embodiments having any other possible combination of the features disclosed above. As such, the particular features disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the exemplary embodiments disclosed herein.

What is claimed is:

1. A device for adjustably measuring tension on a continuous track, the device comprising:
    a shaft having a hollow cross section, the shaft comprising:
        a top end and a bottom end opposed to each other, the top end and the bottom end each having an inner perimeter and an outer perimeter;
        an outer surface between the top end and bottom end, and
        an inner volume;
        wherein the inner perimeter of the top end defines an aperture;
    a pin comprising:
        a top end and a bottom end opposed to each other, the top end and bottom end each having an outer perimeter;
        wherein the bottom end of the pin is disposed within the inner volume of the shaft wherein the top end of the pin has a width that is less than a width of the aperture and the bottom end of the pin has a width that is larger than the width of the aperture, and wherein the pin extends longitudinally through the aperture, and
        wherein the pin is configured to move longitudinally through the aperture;
    a compression member disposed within the inner volume and contacting the bottom end of the pin, wherein the compression member is configured to apply a longitudinal force to the bottom end of the pin;
    a base having a hollow cross section, the base comprising:
        a first end and a second end opposed to each other, and
        an inner surface,
        wherein the hollow cross section is configured to receive the shaft, and
        the base is configured to be attached to the outer surface of the shaft along a length of the shaft;
    wherein when the base is attached to the outer surface of the shaft at a predetermined height, and the pin is depressed into the inner volume of the shaft at a predetermined distance, the distance between the top end of the pin and an end of the base is known.

2. The device of claim 1, wherein the outer surface of the shaft and the inner surface of the base are threaded with corresponding threading, and the base is configured to be screwed onto the shaft.

3. The device of claim 1, wherein a plurality of measurement indicators are disposed on the outer surface of the shaft.

4. The device of claim 3, wherein each of the plurality of measurement indicators correspond to a predetermined distance between the top end of the pin and an end of the base.

5. The device of claim 1, wherein the pin comprises an indicator mark disposed on its top end.

6. The device of claim 5, wherein the indicator mark is level with the aperture when the compression member is subject to a predetermined force.

7. The device of claim 1, wherein the outer perimeter of the top end of the pin is approximately equal to the inner perimeter of the top end of the shaft.

8. The device of claim 1, wherein the outer perimeter of the bottom end of the pin is approximately equal to the inner perimeter of the bottom end of the shaft.

9. The device of claim 1, wherein the compression member is a spring.

10. The device of claim 9, wherein the spring has a known spring constant.

11. The device of claim 9, wherein the spring is a coil spring.

12. The device of claim 9, wherein the spring is a Belleville or leaf spring.

13. The device of claim 1, wherein the base comprises a flanged portion on the first end.

14. The device of claim 1, wherein the flanged portion is configured to fit over a gap in a snowmobile track.

15. The device of claim 1, wherein the base is permanently coupled to the shaft.

16. The device of claim 1, wherein the base is removably coupled to the shaft.

17. The device of claim 1, wherein an orientation of the base with respect to the shaft corresponds to a predetermined force value.

18. The device of claim 1, further comprising a cap disposed at the bottom end of the shaft, wherein the cap abuts the compression member.

19. The device of claim 1, wherein the top end of the shaft comprises a cap having a hollow cross section, the cap configured to receive the top end of the pin.

20. The device of claim 1, wherein the surface or geometry of the top end of the pin is configured to rest against a bottom of a snowmobile slide rail without slipping off.

* * * * *